Oct. 10, 1961 V. P. HONEISER 3,004,242

DATA READ-OUT SYSTEM

Filed Sept. 3, 1958

Inventor
VLADIMIR P. HONEISER
By Philip M. Bolton
Attorney 3,004,242
Patented Oct. 10, 1961

3,004,242

DATA READ-OUT SYSTEM

Vladimir P. Honeiser, Paramus, N.J., assignor to International Telephone and Telegraph Corporation, Nutley, N.J., a corporation of Maryland

Filed Sept. 3, 1958, Ser. No. 758,707
11 Claims. (Cl. 340—172.5)

This invention relates to a read-out circuit for data processing systems, and more particularly to a circuit capable of reading-out indexing information at two different speeds.

In the ordinary data processing system, data is placed on a record in a coded form which lends itself to high-speed read-out. Presently, the most widely used form is binary code. The code, necessarily, is placed on the record in accordance with a particular format. Most usually, the code-format consists of a plurality of information bits arranged in parallel columns and parallel rows. The information bits may be in the form of punched holes in paper or cardboard, localized magnetic forces or conditions on a ferromagnetic material, or a picture of dots on photographic film.

In these known systems, the information bits are sensed or scanned to produce signals representing the position of the bits in the format. This process is called "reading-out." These signals are then converted for teleprinting, punching cards, or high-speed presentation.

Since normally in data processing systems there is a printed presentation of the data information as well as a transfer of the information or a monitored presentation within the system it becomes necessary to provide at least a relatively low-speed data read-out and a relatively high-speed data read-out. The low-speed read-out is used to operate the mechanical printing device while the high-speed read-out is used with the transfer operations or the monitoring operation. In the present art the low-speed operation has been accomplished by transferring all the data to some storage means wherefrom the information is extracted at this relatively low speed to operate the printing device. Storage capacity in a data processing system is at a premium and therefore it becomes clear that it would be desirable to accomplish the dual read-out operations without having to unduly appropriate storage facilities.

It is, accordingly, an object of this invention to provide a read-out circuit, useful in data processing systems, which is capable of reading-out data information at different speeds simultaneously.

A further object is to provide a read-out circuit capable of supplying data information to two presentation devices capable of operating at two completely different speeds.

Another object is to provide a read-out circuit capable of reading-out data information at a TV line scanning rate for alpha-numeric presentation and simultaneously at a frame scanning rate for feeding a mechanical device such as a teleprinter.

Still another object is to provide a read-out circuit, for a multi-column code format, which is capable of reading-out data information at a high speed from one of the columns and at a low speed from the same or another of the columns.

Generally, the hereinafter described embodiment of the invention resides in a data processing system of the type which employs photographic film containing a plurality of frames; each frame having a record dotted raster in the form of a plurality of parallel columns. Each column of the dotted raster consists of a given number of parallel rows, and each row consists of an index mark followed by a given number of data marks. The record is scanned and a succession of pulses is produced corresponding to the data and index marks. Each complete scanning of the record constitutes a frame. A read-out circuit is provided for the indexing and information pulses, which is capable of reading-out the pulses at two different speeds; at the line scan rate and at the frame scan rate. The read-out circuit comprises a high-speed column selector, a low-speed column selector, and a delay device for each of the columns coupled to the column selectors, respectively. Vertical synchronizing pulses are applied, under the control of the high-speed column selector, to one of the delay devices, depending on the column being read-out at the line scan rate, and the vertical synchronizing pulses in coincidence with a particular horizontal sync pulse are applied similarly, under control of the low-speed column selector, to one of the delay devices. The delay devices produce a pulse, in response to the applied pulse, whose trailing edge provides a time reference corresponding approximately to the time position of the index pulses in the selected column.

The above-mentioned and other features and objects of this invention will become more apparent by reference to the following description of an embodiment of the invention taken in conjunction with the accompanying drawing, wherein.

Figures 1, 2:
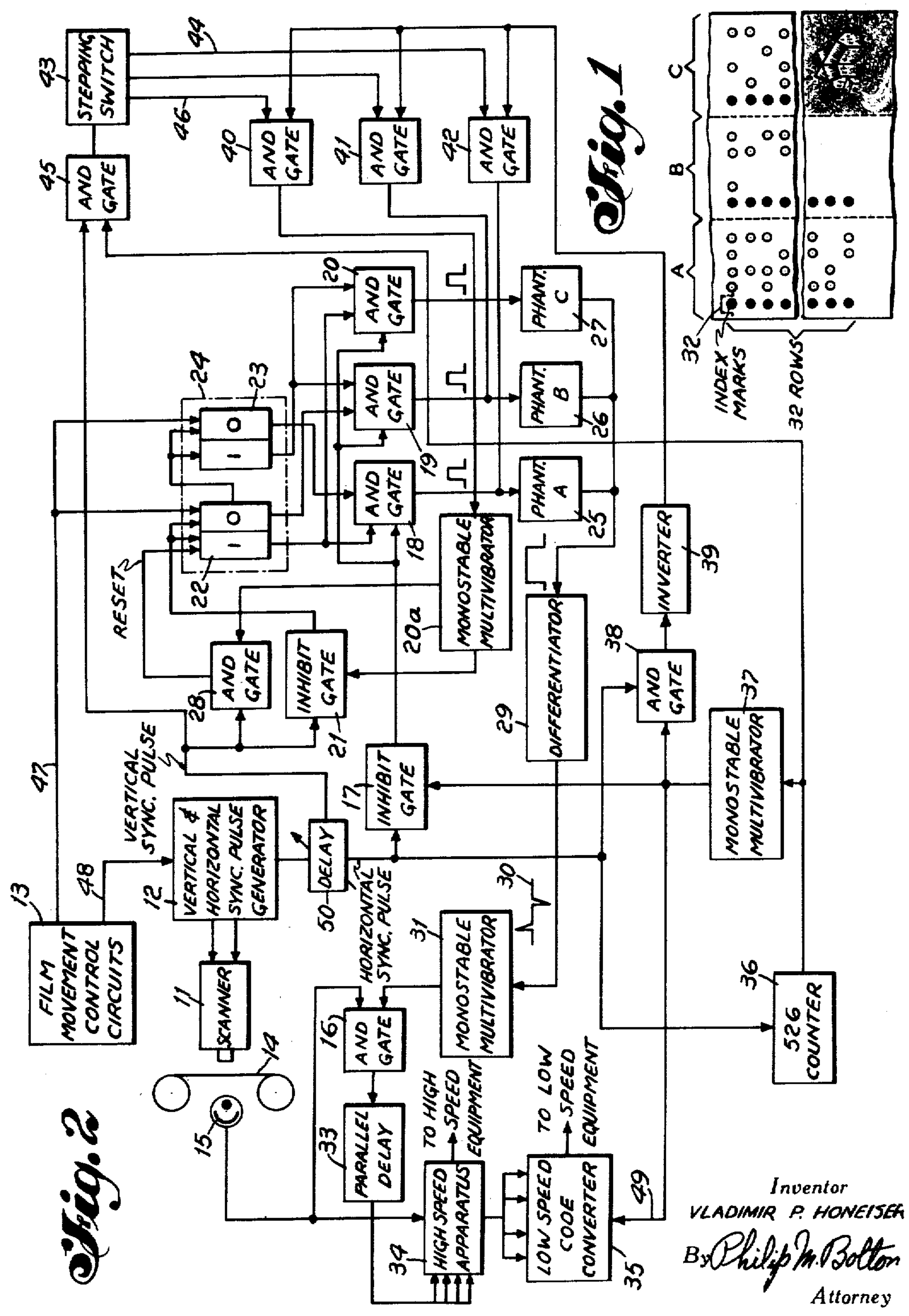
FIG. 1 is an illustration of a multi-column code format.
FIG. 2 is a schematic diagram of the read-out circuit.

The particular format illustrated was adapted in a data processing and recording system described in detail in copending applications of R. L. Whittle et al., one of which is entitled "Data Recording System," Serial No. 754,650, filed August 12, 1958 and another entitled "Data Processing System," Serial No. 761,407, filed September 16, 1958, assigned to the assignee of this application.

In most data processing systems, indexing and selection play an essential part. By way of example, in the system described in the copending applications, a coded dotted raster is printed on film which is used in an aerial photographic system. In order properly to interpret the film which contained pictures of the terrain in an area of reconnaissance, certain information must be known; e.g., the direction of the aircraft, altitude, speed, etc. In the data processing and recorder systems disclosed in the copending applications, the flight data was converted into a code and projected on a cathode-ray tube as a dotted raster. This dotted raster was printed on each frame of film containing the related pictorial information. Thus, each frame contained a picture of the terrain and a picture of the flight data in coded form. In the normal sequence of operation, the code was converted into alpha-numeric characters, which characters were printed on the film. In the code conversion process, it is necessary to read-out certain indexing marks preceding the flight data marks so as to prepare the conversion equipment for receiving this data information.

This invention is directed to a circuit for reading-out such index and information pulses, at two different speeds, in the data processing system.

FIGURE 1 shows the code format which was utilized in the inventions disclosed in the aforesaid copending applications, and may serve as an example of the type of format which may be read by this invention. The code format comprises three parallel columns A, B and C of information marks. Each column comprises a plurality of parallel rows and each row consists of an index mark followed by a given number of data marks. In the illustrated format, there are positions for four data marks in each row. Each position, whether or not occupied by a data mark, constitutes a bit of information. The circuit illustrated in FIGURE 2 is a read-out circuit for identifying the index and information marks in each of the columns A, B and C.

Referring now to FIGURE 2, there is illustrated diagrammatically a scanner 11, which may be a flying spot scanner, under the control of a vertical and horizontal synchronizing pulse generator 12 and the film movement control circuits 13.

A film 14, comprising a plurality of frames, is mounted in desired focal relation to the optic system of the scanner 11. Each frame bears a record dotted raster as shown in FIGURE 1. A photoelectric device 15 associated with the scanner 11 develops a video pulse each time the light from the scanning beam traverses an information dot. Thus, the photoelectric device 15 develops a succession of pulses for each column of the code format. This video information is applied to one input of a gate 16, which will be described later in greater detail.

Since it is desired to read-out the information at two different speeds, it is convenient circuit-wise to select the horizontal scanning rate as the rate for the high-speed read-out and the vertical scanning rate, or the vertical scanning rate plus one line, as the rate for low-speed read-out. These rates may be employed compatibly with TV presentation and teleprinter presentation, respectively.

An inhibit gate 17 passes the horizontal pulses to condition one leg of respective "and" gates 18, 19 and 20. Therefore, the "and" gates 18, 19 and 20 are partially conditioned to be opened on each horizontal sync pulse provided the inhibit gate 17 is not closed, which latter condition is considered in the discussion hereinafter. The vertical sync pulses are simultaneously passed through an inhibit gate 21 to drive bistable multivibrators or flip-flops 22 and 23. The bistable multivibrators 22 and 23 are coupled to provide a normal binary counter 24. Succeeding pulses applied to the counter 24 can be counted at least to the number four. An examination of FIG. 2 will reveal that when the counter 24 is reading 1—0—0—1 the "and" gate 18 will have two of its three inputs conditioned "on" so that, as described above, the horizontal sync pulses passing through gate 17 will produce an output from gate 18. In the preferred embodiment of the invention a normal television presentation of 525 lines is considered, therefore a vertical sync pulse will occur only once for every 525 horizontal sync pulses. Obviously, if some other number of scanning lines were used the vertical and horizontal sync pulses would have a different ratio. The "and" gate 18 will have 525 output pulses delivered to the phantastron 25 before the counter 24 is advanced by a vertical sync pulse to read 0—1—1—0. When the counter 24 reads 0—1—1—0 or decimal two, the "and" gate 19 becomes conditioned to feed output pulses to its associated phantastron 26. The phantastrons 25, 26 and 27 are respectively associated with the columns A, B and C of the dotted raster shown in FIG. 1.

It follows from the above that if the vertical sync pulses are applied to the counter 24, the phantastrons will respectively receive the horizontal sync pulses which have been applied to the respective "and" gates 18, 19 and 20, depending on the count being read in the counter 24. However, since there are only three phantastrons necessary to accommodate the three columns of the dotted raster, the counter 24 must not advance to a count of decimal four, which would be read 0—1—0—1, since this count is not usable. When the counter 24 is reading 1—0—1—0 or decimal three, the inhibit gate 21 is in a closed condition and the "and" gate 28 is partially conditioned to accept and pass the next vertical sync pulse. The next vertical pulse which will be the pulse to cause the system to scan column A will pass through "and" gate 28 to merely reset flip flop 22 to 1—0, thus providing a reading of 1—0—1—1 or decimal one in the counter 24. Monostable multivibrator 20*a* is triggered by the first pulse from 20 and closes 21 but opens 28. When the next vertical sync pulse triggers 22, then 20*a* retriggers itself but receives no pulses from 20. A reading in counter 24 of decimal one or 1—0—0—1 will open "and" gate 18 and the operation is repetitive. The column selection therefore is A, B, C; A, B, C and so on. Since the conventional TV scanning rates (except interlace is not used) are employed in this system one complete column is scanned in $\frac{1}{30}$ of a second.

The phantastrons 25, 26 and 27 function to stretch the horizontal sync pulses applied thereto in order to get a time reference between the scanning operation and the physical location of the dotted raster on the film. For example, phantastron 25 when triggered should produce a pulse whose trailing edge is effective shortly before the scanning beam passes the index dots of column A. The arrangement of the system provides for the passing of the stretched horizontal sync pulse from the phantastron 25 to the differentiator 29 to acquire a negative pulse 30 therefrom at this above-mentioned trailing edge time. The monostable multivibrator 31 operates only in response to a negative trigger pulse 30. Therefore the monostable multivibrator 31 is triggered just prior to the scanning beam passing over the index dots of column A. The monostable multivibrator opens the gate 16 for a period of time long enough to accept the video signal of the index dots even if the index dots are off center because of pyramiding, skew, etc. The pulse 32 of FIG. 1 is the output of the monostable multivibrator 31 and is shown in its relation to the index dots of column A. The time presentation of this monostable multivibrator output is adjusted by the operator when initially setting the invention in operation. Since the physical location of the film is fixed, the sync pulses must be time adjusted. This adjustment is accomplished by the operator who actually looks at the pulse 32 on a scope while simultaneously looking at the dotted raster which has been superimposed on the pulse 32 in order to adjust to the proper relationship. The adjustment apparatus is not shown in the invention except symbolically by the variable delay means 50 since it is not basic to the inventive idea. Likewise, the film movement control circuits 13 are not detailed since such description is found in the copending application "Data Processing System." Phantastrons A, B, C are adjusted for time delay. Having adjusted the sync pulses the device is ready for reading the dotted raster.

When the position of pulse 32 has been adjusted and the apparatus is in operation, the video signals from the index dots, as detected by the photosensitive device 15, will pass through the gate 16 to the parallel delay means 33. The index video signals are delayed for distinct amounts of time to provide gating pulses for the video signals of the four information dots following the index dot on any row of the dotted raster. The coincidence signals produced by the coincidence of the delay index pulses and the video signals are used in the high-speed presentation apparatus 34 and are passed to the low-speed code converter 35. The details of the operationo f the low speed code converters 35, high-speed presentation apparatus 34 and the parallel delay means 33 are found in the above-mentioned copending application entitled "Data Processing System."

The purpose of the low speed operation is to select one row of the dotted raster to be punched on a tape for each complete TV scan of the dotted raster. In other words, every time the scanner 11 scans 32 lines of the dotted raster, one row is selected and is read-out to the mechanical punching device or any other slow speed operation being used. In order that the slow speed selection continues advancing one row down the raster for each 32 rows scanned at high-speed, a counter to count the number 526 is employed. Since there are 525 lines in the TV picture a count of 526 will provide a pulse which follows a complete TV scan or a complete 32 row scan.

While the scanning operation of the scanner 11 is taking place the horizontal sync pulses are passed to the "526" counter 36. When the scanning beam is at the lowest point of the TV picture and has completed 525 lines of the scan the next vertical sync pulse will return the beam to the top of the TV picture. The horizontal sync pulse which is coincident with the return of the beam to the top of the picture is the 526th pulse. This means that the horizontal sync pulse which the counter 36 counts as number one, after the beam has returned, as described above, will correspond to the beam being in the second line. This is true since when the beam was in the first line the counter was reading the number 526. It follows that the horizontal sync pulse which is regarded as a count of one by the counter 36 will continually advance down, in corresponding rows, the dotted raster.

Following this slow advance concept the apparatus produces a pulse output at the count of 526 from the counter 36. This pulse signifies the time for a low-speed "break-in." The pulse from 36 triggers the monostable multivibrator 37 which latter inhibits the gate 17. The pulse from 37 which inhibits 17 also permits gating out desired data pulses at a low speed in 35 out of high-speed data obtained from 34. Since the monostable multivibrator 37 is triggered by a horizontal sync pulse which is simultaneously attempting to pass through the inhibitor gate 17, the monostable multivibrator is unable to inhibit this identical horizontal sync pulse. Therefore, the monostable multivibrator 37 produces an output pulse sufficiently long to inhibit the subsequent horizontal sync pulse and therefore eliminates any critical timing.

With the monostable multivibrator 37 triggered to its unstable state the inhibitor 17 is "closed" and the "and" gate 38 is conditioned "open" to accept and pass the last-mentioned subsequent horizontal sync pulse. The output of the "and" gate 38 is inverted to condition one leg of each of the "and" gates 40, 41 and 42. If the apparatus is slow-speed scanning column A, the stepping switch 43, which can be any well-known stepping switch, is applying a voltage on line 44 to the "and" gate 42. The output of inverter 39 produces an output from the "and" gate 42 to pass the horizontal sync pulse to the phantastron 25. When column A has been completely scanned at the low speed there will be a coincidence between the vertical sync pulse and the output from the counter 36. At this last-mentioned coincident time the "and" gate 45 passes a pulse to step the stepping switch 43 to a second position which will condition the line 46 and open the "and" gate 41 each time there is an output from the inverter 39.

This dual operation of high-speed scan and low-speed scan leads to the following condition. If the device has scanned, for instance, all of column A at the low speed and the first three rows of column B at the low speed, then the low-speed device will be looking forward to receiving the signals representing the fourth row of column B. The fourth row of column B may have a low-speed "break-in" at the time that the apparatus is considering a high-speed scan acceptance of row four of column A. The stepping switch will have conditioned gate 41 to operate phantastron B and the inhibitor gate 17 will prevent the operation of phantastron A. It becomes apparent that the timing of the pulse from phantastron B will allow the video signals representing the first line of row four of column B to be passed to the low speed code converter rather than the signals representing the fourth row of column A. After receipt of these fourth row column B video signals, the fourth row signals of column A are no longer inhibited by 17 and the gate 41 is closed so that the apparatus sees the next high-speed scan of the fourth row of column A. One horizontal line of scan in row four of column A is lost during low-speed operation. This operation is repetitive until the three columns A, B and C have been low-speed scanned and of course in the meantime the high-speed scan has been a continual operation.

If instead of the counter 36, a fixed delay were used, the device could continually high-speed scan the entire dotted raster while only low-speed scanning one particular line determined by the fixed delay.

In FIG. 2 there is shown a line 47 coming from the film movement control circuits 13 to the zero side of each of the flip flops 22 and 23. This line provides for a resetting of the counter 24 to 0—0 when a new frame of film has been inserted in the scanner presentation. There is also shown a line 48 passing from the film movement control circuits 13 to the horizontal-vertical sync pulse generator which provides a control for operating the generator 12 when the film is in proper operation. There is further shown line 49 passing from the counter 36 to the low-speed code converter 37. The necessity of this line is obvious since the low-speed code converter should be controlled only at the count of 526 and the details of its operation are found in the last-mentioned copending application "Data Processing System."

It is particularly significant to note that high-speed read-out of one column and low-speed read-out of a different column may be accomplished almost simultaneously.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. A data processing system comprising a record containing bits of encoded information arranged in parallel columns and rows, means for scanning said record and producing a succession of pulses corresponding to said information bits, each complete scanning of the record constituting a frame, a horizontal and vertical synchronizing pulse generator for said scanning means, a circuit for reading-out certain of said pulses in each of said columns at two different speeds, comprising a high-speed column selector and a low-speed column selector, a delay device for each of said columns coupled to each of said selectors respectively, means under control of said high-speed selector for applying horizontal synchronizing pulses to one of said delay devices depending on the column being read-out at the line scan rate, and means under control of said low speed column selector for applying vertical synchronizing pulses to one of said delay devices, depending on the column being read-out at the frame scan rate, each of said delay devices producing a pulse in response to an applied pulse having a time duration corresponding approximately to the time position of said certain pulses in the selected column.

2. The system according to claim 1, wherein said means under control of said high-speed selector comprises a plurality of gates, one connected to each of said delay devices respectively, and said high-speed column selector comprises a counter having an output lead connected to each of said gates, means for applying said horizontal synchronizing pulses to said counter, said counter producing an output on one of said leads until a given number of pulses is applied to said counter equal to the number of rows in a column, whereupon the output is transferred to another lead in regular sequence, the counter output opening the gate to which it is applied, said horizontal synchronizing pulses also being applied to said gates, whereby the gate opened by said counter output delivers corresponding pulses to the associated delay device.

3. The system according to claim 2, wherein said means under control of said low-speed column selector comprises a plurality of normally closed gates, one connected to each delay device respectively, and said low speed column selector comprises means for sequentially opening one gate at a time, said vertical synchronizing pulses being applied to said gates, the opened gate delivering corresponding pulses to the associated delay device.

4. The system according to claim 3, and further comprising a differentiating circuit coupled to the output side of said delay devices, a gate pulse generator coupled to said differentiating circuit and operative in response to the trailing edge of the differentiated output, said gate generator producing a pulse of sufficient width to enclose an information bit, a coincidence gate circuit connected to said scanning means and said gate generator for producing an output in response to coincident inputs, whereby the output from said gate corresponds to a selected one of said certain pulses.

5. A data processing system comprising a roll of film containing a plurality of frames, each frame bearing a record raster in the form of a plurality of parallel columns, each column consisting of a given number of parallel rows, each row consisting of an index mark followed by a given number of data marks, scanning means respectively scanning said record in lines parallel to said rows and producing a succession of pulses corresponding to said data and index marks, each complete scanning of the record constituting a frame, a horizontal and vertical synchronizing pulse generator for said scanning means; a circuit for reading-out said indexing pulses at two different speeds, at the line scanning rate and at the frame scanning rate, comprising a high-speed column selector and a low-speed column selector, a delay device for each of said columns coupled to said selectors respectively, means under control of said high-speed column selector for applying horizontal synchronizing pulses to one of said delay devices depending on the column being read-out at the line scan rate, and means under control of said low-speed column selector for applying vertical synchronizing pulses to one of said delay devices depending on the column being read-out at the frame scan rate, each of said delay devices producing a pulse, in response to an applied pulse, having a time duration corresponding approximately to the time position of the index pulse in the selected column.

6. The system according to claim 5, wherein said means under control of said high-speed selector comprises a plurality of gates, one connected to each of said delay devices respectively, and said high-speed column selector comprises a counter having an output lead connected to each of said gates, means for applying said horizontal synchronizing pulses to said counter, said counter producing an output on one of said leads until a given number of pulses is applied to said counter equal to the number of rows in a column, whereupon the output is transferred to another lead in regular sequence, said counter output opening the gate to which it is applied, said horizontal synchronizing pulses also being applied to said gates, whereby the gate opened by said counter output delivers corresponding pulses to the associated delay device.

7. The system according to claim 6, wherein said means under control of said low-speed column selector comprises a plurality of normaly closed gates, one connected to each delay device respectively, and said low-speed column selector comprises means for sequentially opening one gate at a time, said vertical synchronizing pulses being applied to said gates, the opened gate delivering corresponding pulses to the associated delay device.

8. The system according to claim 7, wherein said delay devices comprise phantastrons, a differential circuit coupled to the output sides of said phantastrons, a pulse gate generator coupled to said differentiating circuit and responsive to the trailing edge of the differentiated output for producing a pulse of sufficient width to enclose the index mark, and a gate circuit, coupled to the output of said scanning means and said gate generator, responsive to coincident inputs for producing a signal corresponding to an index mark.

9. The system according to claim 8, wherein the high-speed portion of the read-out circuit further comprises a coincident gate, the horizontal synchronizing pulses being applied to one input of said coincident gate, means in the low-speed portion of said read-out circuit connected to another input of said coincident gate for opening said gate in the absence of a vertical synchronizing pulse in the low-speed portion of said circuit, the output of said coincident gate being applied to said plurality of gates, whereby a horizontal synchronizing pulse is applied to one of said delay devices only in the absence of a vertical synchronizing pulse; said low-speed portion of the read-out circuit comprising a second coincident gate circuit coupled to the output side of said low-speed circuit means, a connection for applying horizontal pulses to said second coincident gate, said second coincident gate being opened by the coincidence of horizontal pulses and an output from said low-speed circuit means, the low-speed circuit means delivering an output only when a vertical synchronizing pulse is applied thereto.

10. The system according to claim 9, wherein the low-speed portion of said circuit includes means for delaying the vertical synchronizing pulse so that a different predetermined line is read-out at the frame scan rate.

11. A data processing read-out circuit capable of reading-out indexing information at two different speeds, comprising a high-speed input circuit and a low-speed input circuit, a gate in said high-speed circuit, means for applying only high-speed signals to said gate, means in said low-speed circuit for opening said gate in the absence of an input signal to said low-speed circuit, said low-speed input circuit comprising a gate circuit coupled to the output of said low-speed circuit means, a connection for applying high-speed input signals to said low-speed gate circuit, said gate producing a signal in response to coincident signals from said high-speed input circuit and said low-speed circuit means only when a low-speed signal is applied thereto.

References Cited in the file of this patent

UNITED STATES PATENTS 2,830,285 Davis ---------------- Apr. 8, 1958